United States Patent [19]
Stützle et al.

[11] Patent Number: 5,765,521
[45] Date of Patent: Jun. 16, 1998

[54] PUMP UNIT

[75] Inventors: Günther Stützle; Bernd Schrelber, both of Bad Schussenried; Wolfgang Bruttel, Bad Buchau; Franz Maucher, Bad Waldsee; Kurt Hoffmann, Bad Schussenried, all of Germany

[73] Assignee: Schwaebische Huettenwerke GmbH, Germany

[21] Appl. No.: 732,590

[22] Filed: Oct. 15, 1996

[30] Foreign Application Priority Data

Oct. 17, 1995 [DE] Germany .............. 195 38 633.7

[51] Int. Cl.$^6$ ........................................... F01M 1/20
[52] U.S. Cl. .................. 123/196 S; 123/198 C; 417/16; 184/6.4
[58] Field of Search .............. 123/196 S, 198 C; 417/16, 17; 184/6.4

[56] References Cited

U.S. PATENT DOCUMENTS

| | | | |
|---|---|---|---|
| 2,838,039 | 6/1958 | Smith et al. | 123/196 S |
| 4,531,485 | 7/1985 | Murther | 123/196 S |
| 4,936,272 | 6/1990 | Whitmore | 123/196 S |
| 4,940,114 | 7/1990 | Albrecht | 123/196 S |
| 5,000,143 | 3/1991 | Brown | 123/196 S |
| 5,018,491 | 5/1991 | Fish | 123/196 S |
| 5,121,720 | 6/1992 | Roberts | 123/196 S |
| 5,168,845 | 12/1992 | Peaker | 123/196 S |
| 5,511,522 | 4/1996 | Tran | 123/196 S |
| 5,526,783 | 6/1996 | Ito et al. | 123/196 S |

FOREIGN PATENT DOCUMENTS

| | | | |
|---|---|---|---|
| 55-91188 | 1/1982 | Japan | 417/16 |
| 57-24479 | 2/1982 | Japan | 417/16 |

*Primary Examiner*—Eric R. Solis
*Attorney, Agent, or Firm*—McAndrews, Held & Malloy, Ltd.

[57] ABSTRACT

A supply pump for lubricant or heat transfer liquid of a conventional design is driven by a drive unit independently of the consumer of the lubricant or of the heat transfer liquid. In the event of the failure of the drive unit a forced connection occurs between the pump and the rotating parts of the consumer in order to ensure its supply with the lubricant or the heat transfer liquid at least for a sufficient emergency period. By the independent drive of the supply pump the supply to the consumer can be controlled according to the consumption of lubricant or heat transfer liquid independently of its individual operating characteristic or operating state.

10 Claims, 3 Drawing Sheets

5,765,521

PUMP UNIT

BACKGROUND OF THE INVENTION

The invention primarily relates to an independent unit for transporting lubricating oil in internal combustion engines.

In an internal combustion engine great significance is attached to the consumption-matched supply of oil to all places to be lubricated since just a temporary interruption in the lubrication on account of the high speed at which frictional parts are moved in relation to one another, and on account of the high temperature which is inherent in the parts touching one another, results in dry running and increased abrasion to the complete destruction of the metal parts touching one another. In the case of all engines available at present, forced-feed pumps which are in direct driving communication with the crankshaft of the engine, i.e. always work as long as the engine crankshaft rotates, are therefore used for transport. The used pumps are gear pumps having internal or external toothing or vane cell pumps respectively.

The advantage of the compulsory supply of the engine with the necessary lubricating oil is however achieved for this construction with the disadvantage that the transported oil volume is directly dependent on the speed. Consequently undesired supply conditions for the engine are produced, especially when starting up and at high speeds. When the engine-starts up as such a high volume flow of oil would be desired, because no supporting layer of oil has built up between the parts touching one another. A high oil pressure should also be present, because the viscosity of the oil in the cool state is high and consequently strong frictional losses result in the oil flow. The oil pump is however only set in motion with the start-up of the engine and at a low speed transports a small volume of oil also at low pressure.

On the other hand the oil consumption of the engine is lower at high speeds, because in this state the oil, strongly heated and therefore having reduced viscosity, forms hydrostatically supporting layers between the parts touching one another, which did not have to be constantly exchanged. The high-speed pump however transports a correspondingly high volume of oil at high pressure. Since this can not be received by the engine, it is conveyed back by a relief valve out of the pump directly into the oil collecting pan or into the pump itself. It is consequently associated with a loss of energy, which in extreme cases may be up to 2% of the engine power.

In the course of engine development Otto engines in particular have been constructed for ever higher speeds. Rotations of the crankshaft in the order of magnitude of 6.000 to 7.000/min are today the norm rather than the exception. For a relatively long time experiments have consequently been made to compare the feed characteristics of oil pumps for internal combustion engines, i.e. in particular to "cut off" the high output volumes at high speeds. In this case the constructional measures were centred on the pump itself. Corresponding statements are contained e.g. in the German Patent Specifications 3005657 and 3933978. It has however been shown that also developments of this described type can only partially solve the problem, whether it be because the mechanical design of the oil pump cannot cope with the continuous stress during a complete "car life", whether it be because the remaining energy loss is still regarded as being too high.

BRIEF SUMMARY OF THE INVENTION

With the present invention an independently operating oil pump unit is represented, the capacity of which can be regulated exactly corresponding to the oil consumption determined in the running engine. In this case an uncoupling of the pump drive from the crankshaft of the engine is performed. The previously feared disadvantages of such an uncoupling are counteracted partially by control mechanisms, particularly by mechanically acting emergency units so that the remaining residual danger for the operated engine can be disregarded.

DETAILED DESCRIPTION OF THE INVENTION

Figure 1:
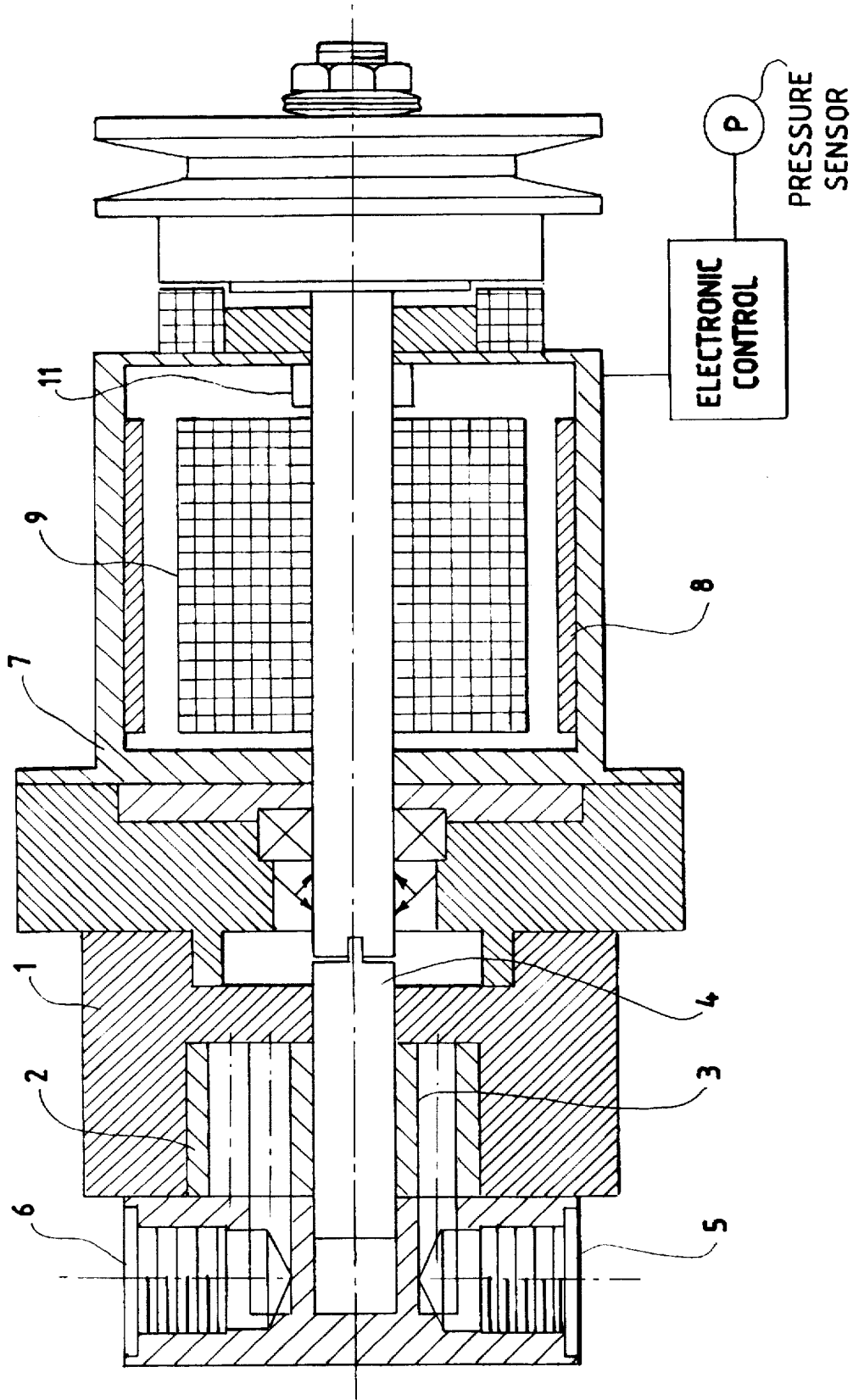
FIG. 1 shows a basic representation of the pump with a directly driving electric motor, FIG. 2 a basic diagram of the entire system of the oil supply with the pump according to the invention, FIG. 3 a system circuit diagram of the control equipment of the unit, and FIG. 4 the basic representation of the forced coupling between the pump and a driving wheel of the internal combustion engine.

In FIG. 1 an internal geared wheel pump having trochoidal toothing, such as e.g. the "Duozentric®" system, is represented in a longitudinal section. The outer rotor 2, the inner toothing of which engages with the outer toothing of the inner rotor or pinion 3, is situated in a closed housing 1. The inner rotor 3 is driven by the axle 4 and sets the outer rotor 2 correspondingly in motion. At the same time the oil to be transported is drawn in via the suction port and the suction pockets 5 into the cavities between the teeth of the inner and outer rotor and with the further rotation of the rotors discharged into the pressure pockets and pressure port 6. The feed action of the pump is based on the fact that the inner rotor 3 is disposed eccentrically to the outer rotor 2. The separation between pressure chamber and suction chamber occurs on the axle with the largest tooth volume. It is remarked that the use of an internal geared wheel pump is only given as an example. A pump having two externally toothed rotors, a vane cell pump or other pump systems could also be used.

The rotor 9 of an electric motor, which is set in rotation by the known inductive interaction of the current flows in the stator laminations 8 and rotor laminations 10, is disposed on the driving axle 4 of the inner rotor in a second housing part 7. The commutator 11 necessary for the current supply is only indicated in principle, because the mode of operation of the electric motor is otherwise assumed to be known.

Figure 2:
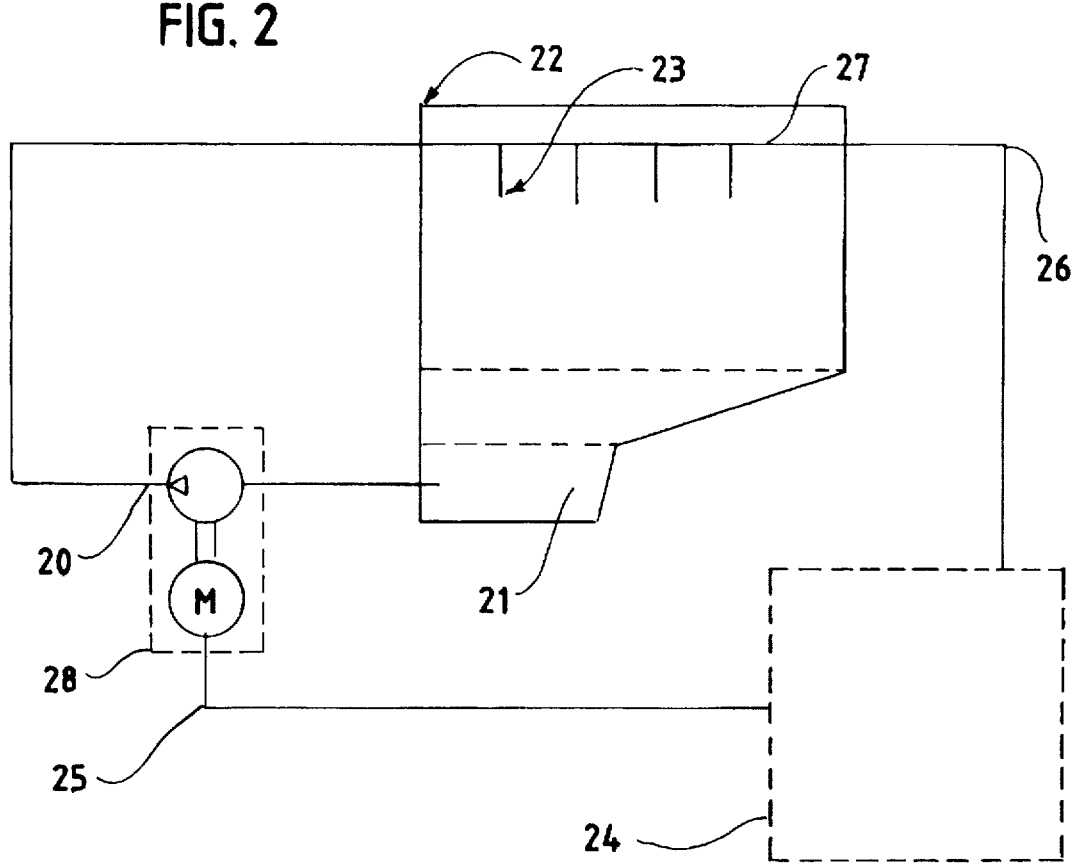

The pump represented in FIG. 1 is designated by no. 20 in FIG. 2. The suction connection of the pump is in communication with the oil pan 21 of the internal combustion engine 22, the pressure connection of the pump 20 with the consuming points 23 of the engine. All electric and electronic control devices which are required for the control of the electric motor driving the pump 20 are situated in the control equipment 24. The control equipment is firstly in communication via a control line 25 with the electric motor of the pump 20, secondly via a measuring line 26 with one or more measuring instruments 27, which are situated at selected measuring points in the oil circulation of the engine.

Figure 3:
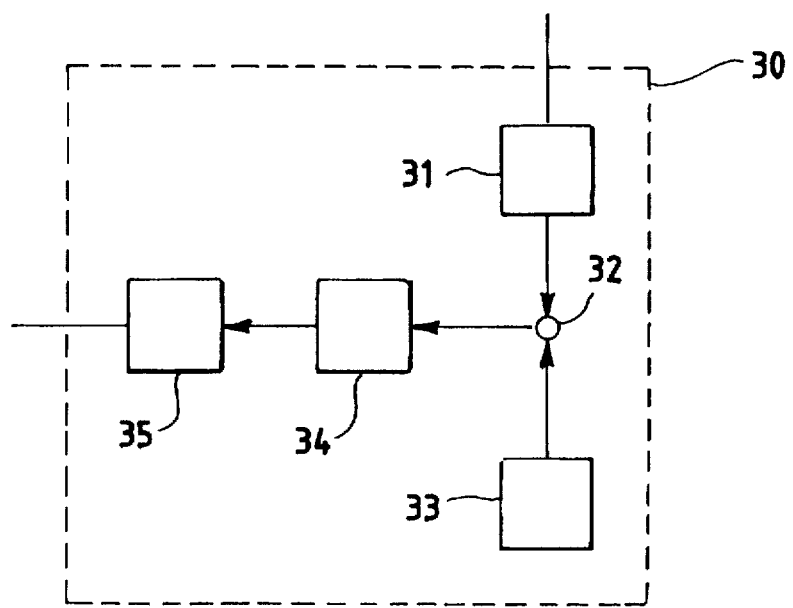

The control equipment 24 from FIG. 2 is designated by 30 in FIG. 3. It has a pressure-measuring amplifier 31, a comparator 32, a set value generator 33, a regulator 34 and an actuating element for the electric motor 35. In FIG. 2 as in FIG. 3 the power supply of the electric motor is not represented, because it can be ignored in the description of the invention.

The individual units of the control equipment 31 to 35 are combined in a known embodiment on a printed circuit board, which is designed in accordance with the prior art and protected against overheating and also the effects of mechanical and electrical disturbance variables. The operating voltage of the circuit is, corresponding to the supply system in motor vehicles, 12 V direct voltage, but may also advantageously have higher voltages, such as for example 24 V. The information processing part of the switching unit may be designed as a digital or analog circuit, depending on what requirements are made on the intelligence of the control.

The components of the switchgear interact as follows:

The pressure-measuring amplifier 31 serves for the conditioning of the sensor signal and the suppression of any interference. It forms the interface to various pressure transducers and is an information-processing part of the overall control.

The comparator 32 subtracts the actual value switched by the sensors via the pressure-measuring amplifier from the set value set in each case and transmits a deviation to the regulator. So that the comparator can work correctly, the set and actual values have to be present in the same dimension and calibration. The comparator also forms an information-processing part of the control.

The set value generator 33 forms the interface to the user. Here the performance characteristics back the control. If for example a constant pressure is to be produced, a constant value is preset here. If it is desired to execute pressure variations depending on the operational state of the engine, here the signal processing is to be arranged from corresponding signal generators. This component also provides a part of the information processing in the control.

The input quantity of the regulator 34 is the deviation made available by the comparator. The regulator processes the input quantity for the actuating element 35 from this deviation. In this case the regulator is adapted to the respective controlled system with control parameters which contain proportional, integral and differential parts. The regulator also belongs to the information processing part of the control.

The actuating element 35 converts the output of the regulator into a speed of the electric motor proportional thereto. This is the power-processing part of the control, which has to perform its task with the smallest possible losses of power. Strong induction currents, which can destroy the control elements, however at least result in too great thermal load of the control, occur in the power-processing region, inter alia dependently on the switching frequency of the control. In this part the control is therefore to be provided with protective devices which are mainly of known type, but require specific selection and adaptation to the operating conditions and the design of the control.

Figure 4:
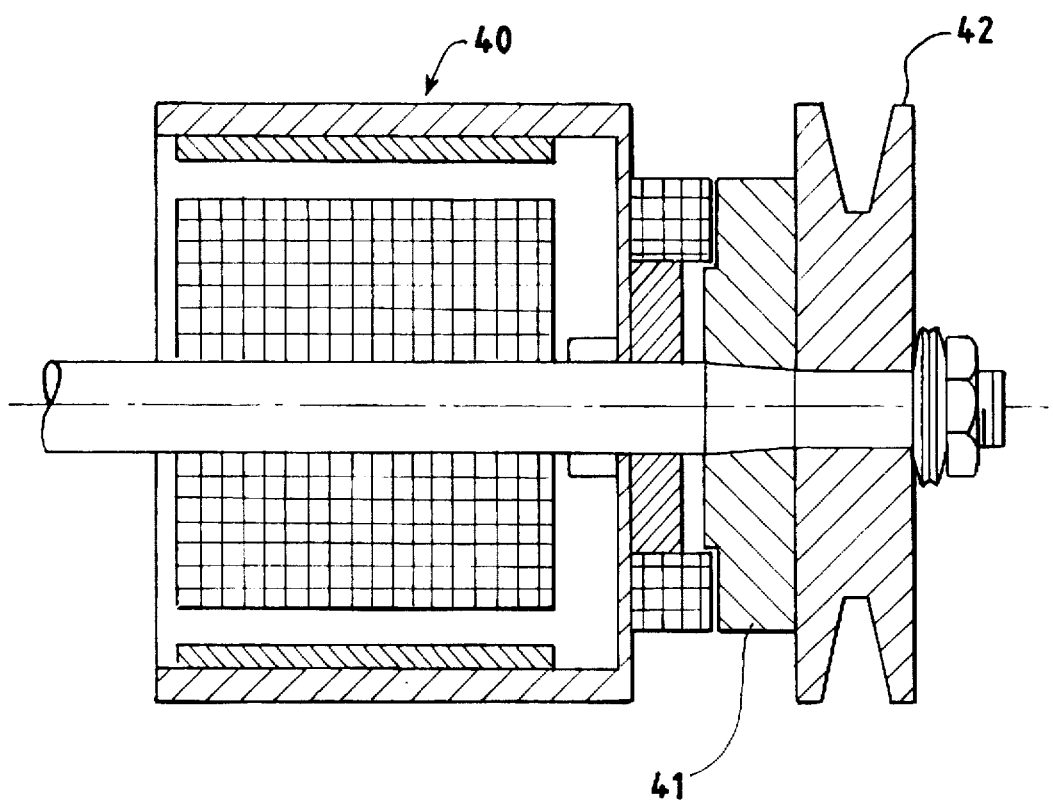

During the operation of the oil pump unit emergencies can occur, and in fact by the failure of the electricity supply of the electric motor, by the failure of a sensor required for the control of the electric motor or by the failure of the control altogether. So that in these cases no damage to the engine occurs by the incorrect operation of the pump, the control or the pump system may overall possess emergency means of the following type:

When the motor current fails, by lowering the alternator speed beneath a lower limit value parallel to weak operating power, the control emits an additional control signal, by which a mechanical or magnetic connection is set in operation, which makes the oil pump be driven further by the crankshaft of the engine. The corresponding principle is represented in FIG. 4. It shows the electric motor 40, the coupling part 41, which connects the pump with a toothed belt or chain wheel 42, and also the toothed belt or the chain 43, which (not shown) is in communication with a driving wheel disposed on the crankshaft. The design of the coupling element may in the conventional manner be a coupling hydraulically or magnetically kept at a distance during the normal operation of the oil pump unit, which is spring-loaded and in the event of trouble by mechanically exerted spring pressure produces the connection between coupling disc and toothed belt.

When a sensor or a sensor signal, which is necessary for the control of the oil pump, fails, the actuating element 35 is triggered so that the motor driving the oil pump runs at a predefined speed and consequently ensures the maximum supply of the oil consumer.

In the event of the failure of the control and consequently the absence of the output signal of the actuating element, the mechanical or magnetic coupling by means of the coupling part 41 is also set in operation.

If desired, in both cases via a further output of the regulator 34, which leads to the ignition circuit of the engine and there actuates a circuit breaker, it may be specified that the ignition current of the engine supplied by the pump with oil is interrupted, so that the vehicle inevitably comes to a stop. For safety reasons this should however be associated with a warning signal for the driver.

The advantages which result from the design according to the invention of the oil pump unit in comparison with the previous pump systems are represented in the following table for the period during the engine operation:

| Characteristic | Conventional pump | Electric motor pump |
| --- | --- | --- |
| feed principle | feed proportional to i.e. engine speed | non-proportional feed |
| regulating principle | regulating valve | voltage-controlled speed regulation, consumption-oriented |
| driving principle | rigid connection | externally driven (electric motor) |
| oil consumption over temperature | not allowed for | allowed for |
| oil consumption over engine speed | partly allowed for, associated with losses | allowed for |
| pump and engine abrasion | allowed for by enlarged pump, associated with losses | allowed for |

-continued

| Characteristic | Conventional pump | Electric motor pump |
| --- | --- | --- |
| oil pressure course | fixed by pump size and gradual shut-off valve | can be adapted to suit the customer or open to choice |
| pressure build-up | only possible during the operation | possible before the starting operation |
| design principle | hot idling, max. oil consumption | max. oil consumption |
| arrangement | crankshaft, sump | open to choice outside the engine |
| cooling and lubrication with the engine stationary | not possible | possible (turbocharger) |
| overall efficiency | poor | very good |
| control parameter | mainly pump pressure | minimum storage pressure |
| susceptibility to soiling | high because of gradual shut-off valve | low, since no mechanical regulating elements |
| service life | system pressure falling over service life | constant pressure over service life |
| noise development | high | low |
| cavitation behaviour | poor | very good, since not in the cavitation region |
| pressure pulsation | high | low |
| oil foaming | high | low |

Further advantages are:

After the stoppage of the internal combustion engine important functional elements, such as for example the turbo charger can be cooled in the oil circulation. The power consumption of the unit in all its operating points lies clearly under the power consumption of previous pump systems.

Since the pump can basically be operated at optimal operating speed, it is possible to reduce the structural volume, whereby the circumferential speed of the toothing, the cavitation sensitivity, the oil foaming and the pulsation in the lubricating system are reduced.

The relief valve of the pump, which always gave rise to difficulties on account of its susceptibility to soiling, is omitted.

Overall the design of the pump unit according to the invention is consequently to be described as extremely advantageous.

It is clear that the described invention is not limited to the application in Otto engines. It can be used in any type of internal combustion engine, but also with prime movers and geared motors having another purpose and of another design, which are dependent on a permanent supply of lubricating or cooling oil provided that the oil consumption curve varies during the operation of the machine.

We claim:

1. An apparatus for pumping oil to an internal combustion engine, said engine comprising a crankshaft; said apparatus comprising:

a sensor for determining a condition in said engine;

a control device responsive to said sensor, said control device adapted to increase or decrease the amount of said oil pumped to said engine depending on said engine condition;

a drive unit comprising a primary pump driver responsive to said control device and an emergency backup mechanism; and a single pump responsive to said drive unit and adapted to pump said oil to said engine.

2. The apparatus according to claim 1, wherein said primary pump driver is an electric motor.

3. The apparatus according to claim 1, wherein said control device further comprises:

a pressure-measuring amplifier constructed and arranged to receive and process a signal from said sensor, said amplifier having an output;

a set value generator providing a set value at an output;

a comparator having at least a first input connected to said output of said pressure measuring amplifier and a second input connected to said output of said set value generator, said comparator providing a comparison signal at an output;

a regulator element connected to said output of said comparator, said regulator element being responsive to said comparison signal; and an actuating element connected to said regulating element, said actuating element being controlled by said regulating element in response to said comparison signal.

4. The apparatus according to claim 1, wherein said emergency backup mechanism is a coupling device that is open when said apparatus is operative, and, in the event of a breakdown of said apparatus produces a forced connection between said crankshaft and said pump.

5. The apparatus according to claim 4, wherein said coupling device is connected to a switching device which eventually stops said engine upon engagement of said coupling device, either within a predetermined time span or when a predetermined condition of said engine is reached.

6. The pump apparatus according to claim 5, wherein said switching device is connected to a display element which signals eventual stopping of said engine upon engagement of said coupling device.

7. The apparatus according to claim 3, wherein said emergency backup mechanism is a coupling device that is open when said apparatus is operative, and, in the event of a breakdown of said apparatus produces a forced connection between said crankshaft and said pump.

8. The pump apparatus according to claim 7, wherein said regulator element is connected to an ignition circuit for said engine such that upon engagement of said coupling device, an output signal from said regulator element interrupts said ignition circuit, eventually stopping said engine.

9. The pump apparatus according to claim 8, wherein said regulator element is connected to a display element which signals eventual stopping of said internal combustion engine upon engagement of said coupling device.

10. A method of delivering oil to an internal combustion engine, said engine comprising a crankshaft, said method comprising the steps of:

sensing a condition in said engine with a sensor to provide a sensed value;

evaluating said sensed value with a control device adapted to send instructions to increase or decrease the amount of said oil pumped to said engine depending on said engine condition;

actuating a primary pump driver connected to a pump and responsive to said control device, said primary pump driver adapted to operate independent of said engine's speed;

engaging an emergency backup mechanism, in the event said sensor or said primary pump driver fails, to force a mechanical connection between said crankshaft and said pump; and pumping said oil to said engine with said pump.

\* \* \* \* \*